United States Patent
van der Lely et al.

(10) Patent No.: US 6,209,485 B1
(45) Date of Patent: Apr. 3, 2001

(54) METHOD OF AUTOMATICALLY MILKING ANIMALS AND A FULLY AUTOMATIC MILKING MACHINE SUITABLE FOR PERFORMING SAME

(75) Inventors: Alexander van der Lely, Rotterdam; Karel van den Berg, Bleskensgraaf; Cornelis J. M. van Overveld, Fijnaard, all of (NL)

(73) Assignee: Maasland N.V., Maasland (NL)

( * ) Notice: Subject to any disclaimer, the term of this patent is extended or adjusted under 35 U.S.C. 154(b) by 0 days.

(21) Appl. No.: 09/400,845

(22) Filed: Sep. 21, 1999

(30) Foreign Application Priority Data

Sep. 21, 1998 (NL) ................................... 1010145

(51) Int. Cl.$^7$ ................................... A01K 5/007
(52) U.S. Cl. ................................... 119/14.02; 119/14.02; 119/14.08
(58) Field of Search ................ 119/14.02, 14.08, 119/14.1, 14.01

(56) References Cited

U.S. PATENT DOCUMENTS 5,351,644 * 10/1994 Everett ........................... 119/14.01
5,873,323 * 2/1999 Berg et al. ...................... 119/14.02

FOREIGN PATENT DOCUMENTS

0091892 * 10/1983 (EP) .
95/35028 * 12/1995 (WO) .

* cited by examiner

*Primary Examiner*—Peter M. Poon
*Assistant Examiner*—Yvonne R. Abbott
(74) *Attorney, Agent, or Firm*—Penrose Lucas Albright

(57) ABSTRACT

A method and apparatus for automatically milking animals which are allowed individually to visit a milking compartment associated with a milking robot for automatically milking animals therein. An animal visiting the milking compartment is milked by the milking robot only when, since it last visited the milking compartment, Q milkings of other animals in the milking compartment have occurred. Based on physiological characteristics, each animal is assigned a number x which indicates how often it should be milked per unit of time such as a day. Intervening milkings Q which must take place before the animal can be milked again is calculated as a function of the animal's corresponding number x. Physiological characteristics which determine x for each animal include its milk yield, its lactation period stage, its age, its movement activity, its feed consumption and its udder's health. The process is computer controlled and the minimum number of milkings Q required by other animals before the relevant animal is again milked is reduced by a factor of 0.5 to 1.0 to avoid numerous visits by animals to the milking compartment without being milked. When an animal is milked after more or less than Q/C milkings by other animals, the subsequent minimum number of milkings Q of other animals required before the animal is again milked is decreased or increased so that the animal approximates x milkings per unit time.

21 Claims, 1 Drawing Sheet

| P1 → / P2 ↓ | 0–10 kg | 10–20 kg | 20–40 kg | 40+ kg |
|---|---|---|---|---|
| 0–15 | 1,5 | 2,0 | 2,5 | 2,8 |
| 15–250 | 2,0 | 2,4 | 2,8 | 3,1 |
| 250+ | 1,6 | 2,0 | 2,3 | 2,7 |

FIGURE 1

| P2 \ P1 | 0-10 kg | 10-20 kg | 20-40 kg | 40+ kg |
|---|---|---|---|---|
| 0-15 | 1,5 | 2,0 | 2,5 | 2,8 |
| 15-250 | 2,0 | 2,4 | 2,8 | 3,1 |
| 250+ | 1,6 | 2,0 | 2,3 | 2,7 |

METHOD OF AUTOMATICALLY MILKING ANIMALS AND A FULLY AUTOMATIC MILKING MACHINE SUITABLE FOR PERFORMING SAME

FIELD OF THE INVENTION

The invention relates to a method of automatically milking animals, such as cows. The invention further relates to a fully automatic milking apparatus which is suitable for performing said method.

BACKGROUND OF THE INVENTION

Methods of automated milking of animals are known. When an animal visits the milking parlor, it is decided on the basis of a milking criterion whether or not the animal will be milked. European Patent EP-A-0 091 892 describes a system in which a cow is milked in the milking parlor, after at least a predetermined period of time has elapsed since her last milking. This has inter alia the disadvantage that mutual differences between animals to be milked are not taken into account. Moreover, it is necessary to measure each time for each animal the beginning and the end of the milking and to record these data, which requires measuring equipment that is sensitive to interference and occupies a relatively large amount of memory capacity.

From International Patent WO-A-95/35028 it is known to use as a milking criterion the number of milkings of other animals which have occurred since the previous milking of the relevant animal; in this situation the animal is milked when this number at least equals a specific minimum number, which may differ for each animal. This milking criterion can be practiced with the aid of simple and cheap means.

SUMMARY OF THE INVENTION

An object of the instant inventions is to refine and improve this latter method. According to the invention this is achieved by assigning each animal a number (x) which indicates how often the animal must be milked per unit time and the specific number of intervening milkings of other animals is calculated for each animal as a function of the corresponding milking number (x). As a result of the fact that the threshold value of the milking criterion depends on an individual target number for the number of milkings of the relevant animal, a desired number of milkings per unit of time can be achieved for each animal.

In a preferred embodiment of the invention, the specific number of milkings is calculated in such a manner that it is proportional to the total number of milkings of all the animals per unit of time, divided by the individual milking number, multiplied by the number of milkings of the relevant animal per unit of time in a recent period of time, divided by the individual milking number. In practice it has appeared that in this manner for each animal the desired number of milkings per unit of time can be provided with a great degree of accuracy.

BRIEF DESCRIPTION OF THE FIGURE

FIG. 1 is a table for cows wherein there is a first animal parameter P1 that extends horizontally for the anticipated milk yields per 24 hours and a second animal parameter P2 which extends vertically comprising the number of days of the cow into the lactation period.

DETAILED DESCRIPTION OF THE PREFERRED EMBODIMENTS

In parameter P1 of FIG. 1, the cows are divided into four classes on the basis of their anticipated milk yield: from 0 to 10 kg milk per day, from 10 to 20 kg, from 20 to 40 kg and above 40 kg. In parameter P2 of FIG. 1, there are three classes: 0–15 lactation days, 15–250 lactation days and more than 250 lactation days. For the combination of the two parameters P1 and P2 there are thus defined 12 classes.

One can also apply other animal parameters, such as the movement activity of the animal (which can be measured inter alia by means of a pedometer which is known per se) or the animal's age or the animal's feed consumption or the health of the animal's udder (which can be measured inter alia with the aid of means for analyzing the milk) or any combination thereof, as desired. Also in this situation further classes can be defined.

On the basis of the reference tables or on the basis of empirical data or both, to each class, a milking number x is assigned, which milking number indicates how frequently each animal in that class has to be milked. Of course the table can also be refined in such a manner that each class only comprises one cow. The table with the classes and their milking numbers is recorded in a computer which is connected to the animal identification system. The computer is adapted to adjust automatically the individual milking number x when an animal passes to another class.

When a cow comes to the milking compartment which is associated with a milking robot in order to be milked, the animal is recognized by the animal identification system. The computer calculates the milking criterion, on the basis of which a decision is made whether or not the cow will be milked. She is milked if since her previous milking, at least a specific number of milkings Q of other animals (a threshold value) has taken place. That specific number of milkings Q is now determined for each animal as a function of the animal's corresponding milking number x, so that a desired number of milkings per unit of time can be achieved for that animal.

For example, the threshold value Q (as $Q_1$ in this formula) can be calculated as follows. The total number of milkings M of all the animals per unit of time is divided by the individual milking number x and multiplied by a correction factor C:

$$Q_1 = C*M/X$$

For example, a group of cows was milked totally 161 times in the past 24 hours. Thus M=161. A specific cow has an average daily milk yield of 28 kg over the last seven days and has been in lactation for 155 days. From the table (see FIG. 1) it will be seen that for this cow, a milking number of 2.8 milkings per 24 hours. Thus X–2.8. Dividing 161 milkings by 2.8 provides 57.5 which (rounded down) is 57. Consequently, from a purely statistical point of view, this cow should be milked again after 57 milkings of other cows. But by applying such a strict milking criterion, in order to be milked at a sufficient frequency, the cows would present themselves rather often at the milking robot. In view thereof and the fact that the milking behavior of cows is not very regular, the number 57 is multiplied by a correction factor C ranging between 0.5 and 1.0. Thus C may be, for example, 0.75. Then $Q_1$ is 42.75 which is rounded up to a value of 43. In this manner the relevant target number x is arrived at for each cow to a lesser or greater extent.

In a preferred embodiment, Q as $Q_2$ is determined as follows. The total number of milkings M of all the animals per unit of time is divided by the individual milking number x, multiplied by the number of milkings m of the relevant animal per unit of time in a recent period of time, divided again by the individual milking number x, and finally multiplied by a correction factor C:

$$Q_2 = C*M*m/x^2$$

The factor m/x is thus added as an extra variable to the equation. This factor still gives a further correction, in the event that during a recent period of time, such as in the last 12 hours, a cow may have been milked more or less often than would have been predicted on the basis of the target number x.

For example, the number m can be determined by measuring the period of time that has elapsed since the next to last milking of the relevant cow and by deducing from this period of time a fictitious number of milkings of this cow in the last 24 hours. When the next to last milking of the relevant cow took place 11.65 hours ago, this means there were a fictitious number of milkings of 4.1 in the last 24 hours. This is more than the target number 2.8, so that Q is corrected by being increased. At a total of again 161 milkings in the last 24 hours, an individual milking number of 2.8 milkings per 24 hours and a correction factor of 0.75, Q as $Q_2$ now obtains the value 63 by 43 being multiplied by 4.1/2.8. Hence, the cow is milked again, provided that 63 milkings of other cows have taken place since her last milkings.

Although we have disclosed the preferred embodiments of our invention, it is to be understood that it is capable of other adaptations and modifications within the scope of the following claims.

What is claimed is:

1. A method of automatically milking animals, which are allowed to move freely in an area intended therefor and to visit individually a milking parlor comprising a fully automated milking robot and an animal identification system, the method comprising prescribing for each animal a milking number indicating how often the relevant animal has to be milked per unit of time, calculating how many intervening milkings $Q_1$ by other animals must take place for the relevant animal to be milked x times per said unit of time, further calculating for said relevant animal a further number of intervening milkings $Q_2$ that must take place from said relevant animal's last milking wherein said number $Q_2$ is a function of the said relevant animal's corresponding milking number, said milking number x being derived from physiological characteristics of said relevant animal and the number $Q_2$ being such as statistically to provide that the relevant animal is likely to be milked upon each of said relevant animal's visit to said milking parlor but is unlikely to be milked more than approximately x times per said unit time.

2. A method in accordance with claim 1, wherein the animal's milk yield per unit of time comprises at least one of said physiological characteristics.

3. A method in accordance with claim 1, wherein the animal's stage in the lactation period comprises at least one of said physiological characteristics.

4. A method in accordance with claim 1, wherein the animal's age comprises at least one of said physiological characteristics.

5. A method in accordance with claim 1, wherein the movement activity of the relevant animal comprises at least one of said physiological characteristics.

6. A method in accordance with claim 5, wherein a step of the method comprises measuring the movement activity of the relevant animal.

7. A method in accordance with claim 5, wherein the method comprises measuring the movement activity of the relevant animal by a pedometer which is connected to the relevant animal.

8. A method in accordance with claim 1, wherein the feed consumption of the relevant animal comprises at least one said physiological characteristic.

9. A method in accordance with claim 1, wherein the health of the relevant animal's udder comprises at least one said physiological characteristic.

10. A method in accordance with claim 1, wherein said physiological characteristics may be selected from a group of physical characteristics which consists of the relevant animal's milk yield per unit of time, the stage of the relevant animal in the lactation period, the relevant animal's age, the movement activity of the relevant animal, the feed consumption of the relevant animal and the health of the relevant animal's udder.

11. A method in accordance with claim 10, wherein each said animal of said animals is classified as being within one of a plurality of physiological characteristics which are selected for a herd of animals that are each being milked in accordance with the method.

12. A method in accordance with claim 11, comprising a step of automatically adjusting the classification of each said animal when such animal passes from one classification to another classification and further adjusting the number x for such animal to said another classification.

13. A method in accordance with claim 1, wherein the numbers $Q_1$ and $Q_2$ of intermediate milkings are each proportional to the total number of milkings M of the herd of animals of which said relevant animal is a member per unit of time.

14. A method in accordance with claim 13, wherein $Q_1$ is proportional to M divided by x for each said animal.

15. A method in accordance with claim 14, comprising multiplying M/x to arrive at $Q_1$ by a correction factor (C), said correction factor being a selected number between 0.5 and 1.0.

16. A method in accordance with claim 1, wherein $Q_2$ is calculated so that it is proportional to the number of milkings m of the relevant animal per unit of time in a recent limited period of time.

17. A method in accordance with claim 1, wherein $Q_2$ is proportional to M/x multiplied by m/x.

18. A method in accordance with claim 17, which comprises multiplying $Mm/x^2$ to arrive at $Q_2$ by a proportionality factor C which is a number selected from between 0.5 and 1.0.

19. Apparatus for automated milking of animals, which comprises a milking compartment, a robot means associated with said milking compartment for automatically milking animals in said milking compartment, computer control means for controlling for each animal which is milked by the apparatus the number of intervening milkings of other animals that must take place before the relevant animal can again be milked in said milking compartment by said robot means, said computer control means being governed by the formula: $Q_1 = C + M/x$ wherein $Q_1$ equals the number of intervening milkings required before the relevant animal can be milked again, C equals a selected number between 0.5 and 1.0, M equals the total number of milkings in said milking compartment by said milking robot during a selected period of time which total number is greater than $Q_1$, and x is a number assigned to said relevant animal based on the relevant animal's classifications of physiological characteristics consisting of one or more of the following physiological characteristics: the relevant animal's milk yield per unit of time, the stage of the lactation period of the relevant animal, the relevant animal's age, the movement activity of the relevant animal, the feed consumption of the relevant animal, and the health of the relevant animal's udder.

20. An apparatus in accordance with claim 19, wherein next after said relevant animal has been milked a further time wherein the intervening number of milkings of other animals by the apparatus since said first mentioned milking is the number m, said computer control means is then governed by the formula:

$$Q_2 = CMm/x^2$$

wherein $Q_2$ equals the number of intervening milkings by other animals required before the relevant animal can be milked a further time, C equals a selected number between 0.5 and 1.0, M equals the total number of milkings in said milking compartment by said milking robot during a selected period of time which total number is greater than $Q_2$ and x is a number assigned to said relevant animal based on the relevant animal's classifications of physiological characteristics consisting of one or more of the following physiological characteristics: the relevant animal's milk yield per unit of time, the relevant animal's stage of lactation, the relevant animal's age, the movement activity of the relevant animal, the feed consumption of the relevant animal, and the health of the relevant animal's udder.

21. An apparatus in accordance with claim 19, wherein one of the physiological characteristics on which the number x is based which comprises movement activity of the relevant animal is measured by a pedometer which is connected to the relevant animal.

* * * * *